Figure 1:
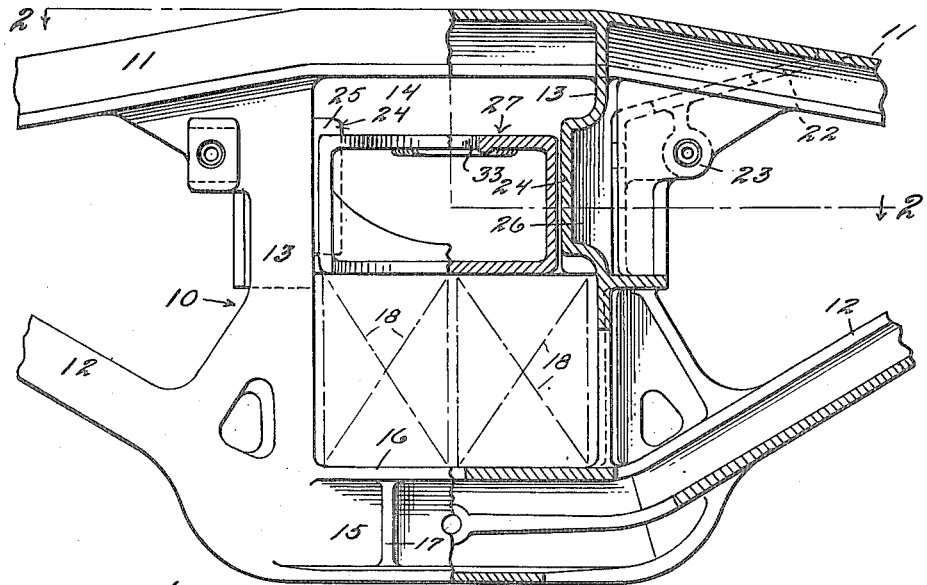

April 7, 1936.   P. R. DRENNING ET AL   2,036,858
THREE-PART TRUCK
Filed Nov. 16, 1931   2 Sheets-Sheet 1

Inventors
Percy R. Drenning,
Sterling F. Ashley &
Howard T. Casey

By John Milton Jester
Attorney

Inventors
Percy R. Drenning
Sterling F. Ashley
Howard T. Casey

Patented Apr. 7, 1936

2,036,858

UNITED STATES PATENT OFFICE 2,036,858

THREE-PART TRUCK

Percy R. Drenning, Sterling F. Ashley, and Howard T. Casey, Baltimore, Md., assignors to T. H. Symington & Son, Inc., Baltimore, Md., a corporation of Maryland Application November 16, 1931, Serial No. 575,384

22 Claims. (Cl. 105—207)

The invention relates to railway car trucks and has for its general object the provision of a truck involving but three framing members.

An important object of the invention is to provide a truck of such construction as to eliminate the usual spring plank and thereby not only reduce the weight of the entire assembly and cut down the number of necessary parts but also obviate the disadvantages which result from manufacturing variations in spring planks, it being well known that unless the spring plank be of exactly the proper length, "cocking" or canting of the side frames is caused.

Another object of the invention is to provide a truck in which the spring plank is eliminated without being replaced by a tie or other means connecting the side frames, the truck bolster being the only transverse and tie member between the wheels and axles.

A further object of the invention is to provide a truck of this character in which the side frames and the bolster are formed with coacting means operating to maintain the proper relation of the parts so that displacement thereof cannot occur under any circumstances.

A more specific object of the invention is to provide a truck having novel means integral with the bolster and the side frames for locking them together without the employment of securing members of any sort.

Another object is to provide a truck in which the side frames are of special form to increase its area of contact with the bolster and thereby insure substantially a ninety degree relation between the side frames and the bolster, or in other words to effect and maintain squaring of the parts, said increase in the bearing surfaces also distributing the shocks and wear so that the parts will have a longer life.

Still another object is to provide a truck of this variety in which the means locking the bolster and side frames together is maintained operative simply by the springs so that upon removal of the springs the bolster may be dropped down and the side frames disconnected therefrom in a very simple manner as compared with the effort involved in handling the standard type of truck.

Yet another object is to provide a truck in which the elimination of the spring plank makes it possible to use a bolster of greater depth and consequently greater beam strength capable of withstanding unusually severe strains and stresses.

An additional object is to provide a truck embodying the above outlined advantages and which will at the same time be simple and inexpensive to make, easy to assemble and disassemble, positive in action, efficient and durable in service, and a general improvement in the art.

Figure 2:
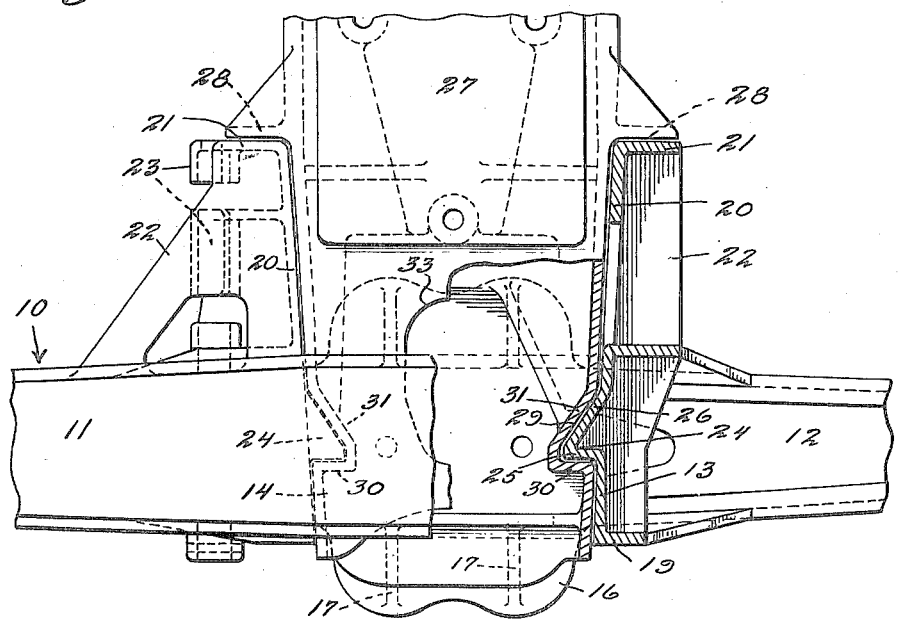
Figure 3:
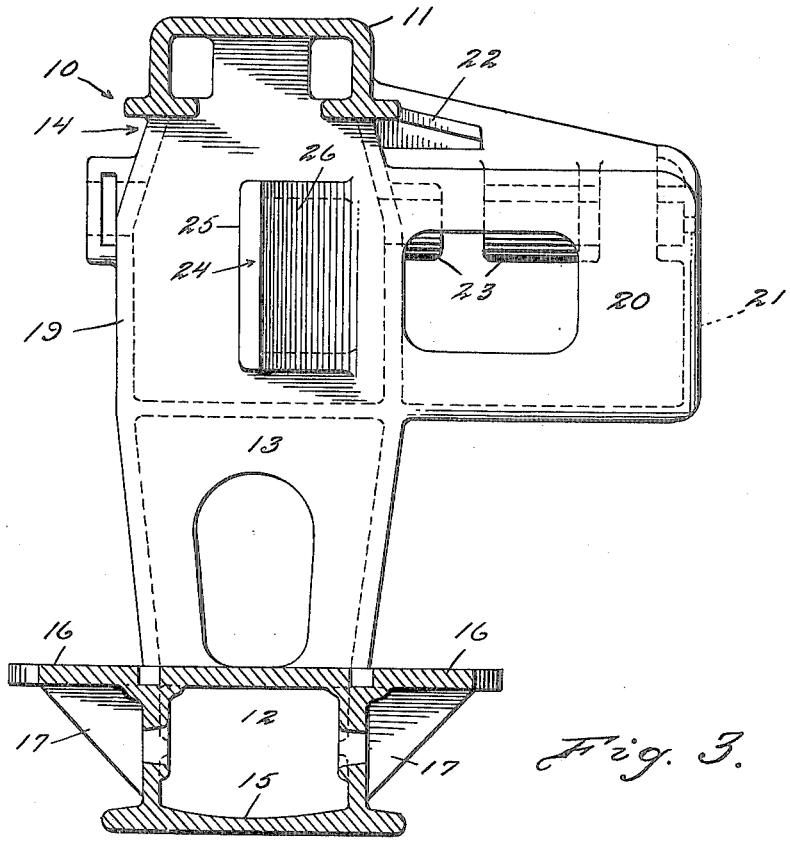
Figure 4:
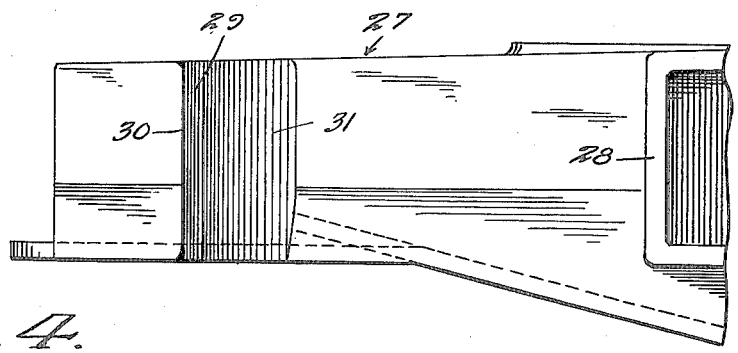

To the attainment of the foregoing and other objects and advantages, the invention preferably consists in the details of construction and the arrangement and combination of parts to be hereinafter more fully described and claimed, and illustrated in the accompanying drawings in which:

Figure 1 is a view looking at one side of a truck embodying the invention, parts of the structure being shown in elevation and the remainder in vertical section, Figure 2 is a view of a portion of one side of the truck, this view being half in top plan and half in horizontal section, as indicated by the line 2—2 in Figure 1, Figure 3 is a vertical cross sectional view through the center of the side frame, Figure 4 is a side elevation of the end portion of the bolster alone.

At the very outset it should be understood that while the truck comprises a pair of side frames and a bolster, all of which are of novel and improved form throughout, these are in their specific details disclosed in separate applications, the present invention relating to the assembly or combination as a whole.

Referring more particularly to the drawings, we have shown the truck as comprising side frames indicated as a whole by the numeral 10, only one being shown as it is obvious that there must be two, one at each side of the truck. Each side frame is represented as comprising a compression member 11 and a tension member 12 connected by column guides 13 which are spaced apart to define the usual window opening 14. The compression and tie members converge outwardly as is customary and are intended to carry the usual journal boxes, not shown as they may be of the integral or any other desired type.

The lower ends of the tension members merge into the bottom tie or beam portion 15 which is preferably of closed box-like rectangular form and provided at its top with a spring seat portion 16 projecting laterally beyond the sides of the frame and reinforced as by webs 17. This seat constitutes a support for whatever truck springs are provided for supporting the bolster to be described. These springs are shown only diagrammatically at 18 by the dot and dash lines. Any type of spring nest can be used depending upon the preference of the user and may be held against displacement by any appropriate means, the present invention not being concerned with these details. As it is a feature that the usual spring plank is eliminated it is of course apparent that the spring nest will engage directly upon the seat 16.

Due to the elimination of the spring plank it is apparent that for squaring the bolster with respect to the side frame reliance must be placed solely upon the cooperative engagement of the bolster with the side frames. As a consequence, the column guides 13 are widened outwardly with respect to the outer side of the side frame as shown at 19 and are also formed with lateral extensions 20 projecting beyond the inner face of the side frame and having their confronting faces formed as continuations of or flush with the sides of the window opening so as to define relatively large areas adapted to engage with the bolster to be described. The extremities of these extensions terminate in flanges 21 intended to serve as abutments for cooperation with abutting means on the bolster and to withstand the thrust diagonal reinforcing webs or ribs 22 are provided merging into the sides of the compression members 11. Brake hanger brackets 23 are formed on the outer sides of these extensions. As these brackets may be varied in many respects they are not described in detail.

For cooperation with means on the bolster to be described, the column guides are formed on their confronting faces with projections 24 extending into the window opening and located at the upper portion thereof. These projections are of course integral with the remainder of the side frame and may be of hollow formation as illustrated and are preferably so shaped as to provide abutment shoulders 25 and inclined portions 26 leading thereto, the shoulders being disposed toward the outer side of the frame.

The bolster is indicated as a whole by the numeral 27 and may in many respects be more or less similar to those of the ordinary type though it is equally apparent that it may be of a special design particularly as regards its depth at the center, it being clear that owing to the absence of the usual spring plank it is possible for the bolster to have greatly increased depth and consequently greater beam strength so as to resist even unusually severe strains and stresses. The bolster traverses the space between the side frames and has its ends entering the window openings and seating upon the springs 18. At its opposite sides this bolster is formed with lateral projections 28 constituting the abutment shoulders engaging against the flanges 21 or inner ends of the extensions 20 so as to limit outward movement of the bolster with respect to the side frame. As the extensions 20 have their confronting faces converging slightly toward the outside of the frame the bolster has its opposite sides correspondingly tapered or inclined so as to engage properly against the inner faces of the extensions 20 and column guides so as to provide a large bearing surface or area which will insure squaring of the truck or maintaining the bolster at substantially a ninety degree angle with respect to the side frames. For locking the bolster in proper cooperative relation to the side frames, we have shown it as formed at its opposite sides with recesses 29 adapted to receive the projections 24 and having square abutment shoulders 30 engaging against the shoulders 25. The other walls 31 of these recesses are inclined to correspond to the inclined portions 26 of the projections 24. However, the structure may be lightened somewhat by providing an opening 33 in the top wall inwardly with respect to the recesses, that is to say nearer the center of the truck.

In assembling the truck, it will be seen that when the bolster is so positioned that its ends are at the lower portions of the window openings 14 the ends may be passed therethrough owing to the fact that as the projections 24 are located at the upper portions of the window openings they do not obstruct passage of the bolster through the lower portions. The bolster ends having been introduced within the window openings, the bolster is moved upwardly so that the projections 24 will be received within the recesses 29. At this time or under these conditions the shoulders 30 projecting from the opposite sides of the bolster will abuttingly engage the flanges or inner ends 21 of the extensions 20, the engagement of these shoulders preventing the side frames from being moved toward each other. The abutting engagement of the shoulders 30 and 25 will prevent separating movement of the side frames. The last assembling step is the placing of the spring nests within the window openings and beneath the ends of the bolster.

In use, a truck constructed in this manner will perform, in all essential respects, substantially like any other as the differences are structural and not functional. Even though the spring plank be omitted as is an important feature, it is apparent that the cooperation of the abutments on the bolster and side frames and the interengagement of the projections and recesses will operate to maintain the parts assembled and prevent any undesired play or shifting. At the same time it will be observed that the recesses 29 and projections 24 are slidably engaged and will move relatively in accordance with oscillations of the truck springs. It should be clear that the bolster cannot become disengaged from the projections 24 as long as the springs are in place beneath the bolster. The question of bearing area and its relation to the squaring of the truck has already been discussed and need not be repeated. In fact it is believed from the foregoing that the construction, operation and advantages will be readily apparent to one skilled in the art without further explanation.

While we have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, we claim:

1. In a railway truck having axles, the combination of side frames each having a window opening, a bolster extending into the window openings and constituting the sole connection, other than the truck axles, between the side frames, transverse shoulders formed integrally on the side frames and extending into the window openings, shoulders extending into the sides of the bolster and coacting with the first named shoulders for preventing lateral movement of the side frames outwardly with respect to the bolster, other means on the side frames engaging the bolster for maintaining a squared relation, and means coacting with said last named means for preventing lateral movement of the side frames inwardly with respect to the bolster.

2. In a railway truck having axles, the combination of side frames having columns spaced apart to define window openings, a bolster extending into the window openings and constituting the sole connection, other than the axles, between the side frames, cooperating abutment means on the bolster and side frames located in spaced relation inwardly of the inner faces of the columns for taking torsional and canting strains occurring between the bolster and the side frames and for preventing outward movement of the bolster with respect to the side frames, and other means formed integrally upon the bolster and side frames and located within the confines of the window openings and including shoulders at right angles to the longitudinal axis of the bolster for preventing outward movement of the side frames with respect to the bolster.

3. In a railway truck having axles, the combination of a pair of side frames having window openings therein, a bolster having its ends located within the window openings, said bolster constituting the sole connection, other than the truck axles, between the side frames, means transverse to the longitudinal thrust of the bolster inwardly with respect to the side frames formed integrally upon and extending into the opposite sides of the bolster, other means formed integrally upon the side frames and extending into said window openings and coacting with said last named means for resisting longitudinal thrust of the bolster inwardly with respect to the side frames, said side frames being provided at their inner sides with extensions at the sides of the window openings projecting inwardly a distance substantially equivalent to the width of the frames, the end portions of the bolster engaging snugly against said extensions for effecting squaring action of the bolster with respect to the side frames, and abutment means projecting from the sides of the bolster and engageable with the inner ends of said extensions for preventing lateral movement of the bolster outwardly with respect to the side frames.

4. In a railway truck having axles, the combination of a pair of side frames having window openings therein having dimensions adapted to receive a spring assembly of A. R. A. standard or equivalent dimensions, a bolster having its ends located within the window openings, said bolster constituting the sole connection, other than the truck axles, between the side frames, means formed integrally upon the bolster and side frames for holding the same assembled and comprising abutment surfaces extending longitudinally of the side frames within the confines of the window openings and further including coacting abutment surfaces on the sides of the bolster and extending interiorly thereof, and coacting projections on the inner faces of the side frames and the outer sides of the bolster arranged in abutting relation for taking lateral and longitudinal thrusts of the bolster with respect to the side frames.

5. In a railway truck having axles, the combination of a pair of side frames having window openings therein, a bolster having its ends located within the window openings, said bolster constituting the sole connection, other than the axles, between the side frames, means within the window openings formed integrally upon the bolster and side frames for holding the same assembled and comprising flatly engaging surfaces at right angles to the line of thrust, said means preventing longitudinal movement of the bolster with respect to the side frames while enabling the former to move vertically with respect to the latter, and elongated guides projecting inwardly from the inner sides of the side frames and embracing the bolster, and having longitudinal abutting engagement therewith.

6. In a railway truck having axles, the combination of a pair of side frames having window openings therein, a bolster having its ends located within the window openings, said bolster constituting the sole connection, other than said axles, between the side frames, means formed integrally upon the bolster and side frames and within the confines of the latter for holding the bolster and side frames assembled comprising interfitting projections and recesses having coacting surfaces at right angles to the bolster formed on the side frame and bolster respectively, and elongated guides at the sides of the window openings projecting inwardly toward the center of the truck and conformingly engaging against the sides of the bolster, and having longitudinal abutting engagement with portions of the bolster.

7. In a railway truck having axles, the combination of a pair of side frames having window openings therein, a bolster having its ends located within the window openings, said bolster constituting the sole connection, other than the axles, between the side frames, means formed integrally upon the bolster and side frames within the window openings for holding the bolster and side frames assembled, said means comprising vertically slidably engaged portions on the side frames and bolster, said portions each including a single surface at right angles to the length of the bolster for preventing lateral movement of the side frames outwardly with respect to the bolster, and lugs on the sides of the bolster coacting with the inner sides of the side frames and for preventing lateral movement of the side frames inwardly with respect to the bolster.

8. In a railway truck, the combination of a pair of side frames each having a window opening defined between column guides, a bolster extending and constituting the sole connection between the side frames and having its ends extending within said window openings, cooperating abutment means on the bolster and column guides spaced inwardly from the inner faces of the latter, and wedge shaped means on the column guides cooperating with wedge shaped means on the bolster within the confines of the window openings for preventing lateral displacement of the side frames while permitting vertical movement of the bolster with respect thereto, both wedge shaped means having surfaces transverse to the longitudinal axis of the bolster.

9. In a railway truck having axles, the combination of a pair of side frames each having a window opening defined between column guides, a bolster extending and constituting the sole connection, other than the axles, between the side frames and having its ends extending within the window openings, guides projecting inwardly from the column guides bearing against the sides of the bolster, cooperating abutment means on the second named guides and bolster for preventing relative lateral displacement of the side frames and bolster, the bolster and column guides having slidably engaged shoulders thereon within the confines of the window openings for preventing lateral displacement of the side frames in the other direction, the shoulders being at right angles to the longitudinal axis of the bolster.

10. In a railway truck, the combination of a pair of side frames each formed with a window opening defined between column guides, a bolster extending and constituting the sole connection between the side frames and having its ends extending within the window openings, the column guides being formed with projections within the confines of the window openings, and the bolster being formed with recesses within the confines of said window openings slidably receiving said projections, the projections and recesses having square shoulders and inclined wall portions leading thereto.

11. In a railway truck having axles, the combination of side frames, a bolster extending through and constituting the sole connection, other than said axles, therebetween, cooperating abutment means on the bolster and side frames located in spaced relation to the inner faces of the latter for taking thrust in one direction only and squaring the bolster, and other means formed integrally upon the bolster and side frames within the boundaries of the side frames for taking thrust in the opposite direction, and said latter means holding the side frames and bolster in assembled relation, said other means being directly transverse to the lengthwise thrust of the bolster.

12. In a railway truck having axles, the combination of a pair of side frames each formed with a window opening defined between column guides, spaced guides on each side frame projecting inwardly and having their confronting surfaces flush with the confronting surfaces of the column guides, said guides terminating in abutments, a bolster extending and constituting the sole connection, other than said axles, between the side frames and having its ends extending into the window openings, laterally extending abutments on the sides of the bolster engaging against said first named abutments, the cooperation of said guides with the sides of the bolster acting to square the latter with respect to the side frames, integral projections on the column guides extending into the window openings, and said bolster being formed with recesses slidably engaging said projections.

13. In a railway truck, the combination of a pair of side frames each formed with a window opening defined between column guides, a bolster extending between the side frames and having its ends extending within the window openings, the column guides and the bolster being formed within the confines of the window openings with coacting and interengaging projections and recesses each having a square abutment shoulder and an inclined wall leading thereto.

14. In a railway car truck, the combination of side frames each having a window opening defined between column guides, a bolster extending between the side frames and having its ends located within the window openings, the column guides being formed within the confines of the window openings with wedge shaped projections, and the bolster being formed in opposite sides of each end with wedge shaped recesses conformingly receiving said projections, said projections and recesses being of right triangle shape.

15. In a railway car truck, the combination of a pair of side frames each having a window opening defined between column guides, a bolster having its ends located within said window openings, the column guides being formed within the confines of the window openings with projections having a square abutment shoulder located toward the outer face of the frame and having an inclined wall extending to the shoulder, and each side of each end of the bolster being formed with a recess having a square abutment shoulder engaging against the first named shoulder and also having an inclined wall lying against said first named inclined wall.

16. In a railway truck, the combination of a pair of side frames each having a window opening therein defined between column guides, the column guides having their confronting faces converging toward the outer side of the side frame, extensions projecting in diverging relation from the inner face of the side frame as continuations of the confronting faces of the column guides, a bolster having its ends extending within the window openings, the ends of the bolster being tapered in accordance with and engaging against the inner faces of the column guides and said extensions, and means for locking the bolster to the column guides.

17. In a railway truck, the combination of a pair of side frames each having a window opening therein defined between column guides, the column guides having their confronting faces converging toward the outer side of the side frame, extensions projecting in diverging relation from the inner face of the side frame as continuations of the confronting faces of the column guides, a bolster having its ends extending within the window openings, the ends of the bolster being tapered in accordance with and engaging against the inner faces of the column guides and said extensions, means on the bolster abutting the inner ends of said extensions for taking longitudinal thrust of the bolster in one direction, and coacting means on the column guides and bolster sides for connecting the same and taking longitudinal thrust of the bolster in the other direction.

18. In a railway car truck, side frames including spaced column guides defining a window opening, a bolster extending between and connecting the side frames and having its ends extending within the window openings, means within the confines of the window openings for locking the bolster to the side frames, and elongated guides formed integrally upon the column guides at the inner sides of the side frames and embracing the bolster, said elongated guides having bolster engaging surfaces of a length materially exceeding the width of the column guides.

19. In a railway car truck, side frames including spaced column guides defining a window opening, a bolster extending between and connecting the side frames and having its ends extending within the window openings, means within the confines of the window openings for locking the bolster to the side frames, and elongated guides formed integrally upon the column guides at the inner sides of the side frames and embracing the bolster, said elongated guides having bolster engaging surfaces of a length materially exceeding the width of the column guides and having outwardly extending marginal flanges.

20. In a railway car truck, side frames including spaced column guides defining a window opening, a bolster extending between and connecting the side frames and having its ends extending within the window openings, means within the confines of the window openings for locking the bolster to the side frames, and elongated guides formed integrally upon the column guides at the inner sides of the side frames and embracing the bolster, said elongated guides having a length materially exceeding the width of the column guides, the end portions of the bolster being tapered and the confronting faces of the column guides and elongated guides being correspondingly tapered.

21. In a railway car truck, side frames including spaced column guides defining a window opening, a bolster extending between and connecting the side frames and having its ends extending within the window openings, means within the confines of the window openings for locking the bolster to the side frames, elongated guides formed integrally upon the column guides at the inner sides of the side frames and embracing the bolster, said elongated guides having a length materially exceeding the width of the column guides, the end portions of the bolster being tapered and the confronting faces of the column guides and elongated guides being correspondingly tapered, and abutments on the sides of the bolster engaging against the innermost marginal flanges of said elongated guides.

22. In a railway truck, the combination of side frames each having a window opening, a bolster extending into the window openings and connecting the side frames, transverse shoulders formed integrally on the side frames and extending into the window openings, shoulders extending into the sides of the bolster and coacting with the first named shoulders for preventing lateral movement of the side frames outwardly with respect to the bolster, other means on the side frames engaging the bolster for maintaining a squared relation, and means coacting with said last named means for preventing lateral movement of the side frames inwardly with respect to the bolster.

PERCY R. DRENNING.
STERLING F. ASHLEY.
HOWARD T. CASEY.